United States Patent

[11] 3,595,288

[72] Inventors Adrian L. Landers;
 Commodore B. Byrd, both of Many, La.
[21] Appl. No. 769,338
[22] Filed Oct. 21, 1968
[45] Patented July 27, 1971
[73] Assignee ADCO Mfg. Co., Inc.
 Many, La.

[54] TREE HARVESTING METHOD AND APPARATUS
 19 Claims, 28 Drawing Figs.
[52] U.S. Cl. .................................................... 144/309 AC,
 144/2 Z, 144/3 D, 144/34 R
[51] Int. Cl. ..................................................... A01g 23/02
[50] Field of Search ........................................... 144/2, 3,
 34, 309, 311, 242, 208; 214/3; 180/42—44

[56] References Cited
 UNITED STATES PATENTS
| 2,843,165 | 7/1958 | Sherron | 144/3 |
| 3,063,173 | 11/1962 | Wardle | 180/42 |
| 3,275,049 | 9/1966 | Gunn | 144/242 |
| 3,340,912 | 9/1967 | Williams et al. | 144/2 |
| 3,414,072 | 12/1968 | Hodges et al. | 180/43 |
| 3,464,468 | 9/1969 | Thompson et al. | 144/3 |

FOREIGN PATENTS
| 496,245 | 9/1953 | Canada | 144/34 |

OTHER REFERENCES
Publication: The Washington Post; page B 6; Oct. 19, 1961.

Primary Examiner—Gerald A. Dost
Attorneys—Edmund F. Bard and Donald H. Fidler

ABSTRACT: An improved self-propelled, four-wheel tree harvester is disclosed having a shear knife assembly and delimber arms mounted on its forward end, and having a gripping feedworks suspended beneath its chassis and between its wheels. The harvester operates to shear off a standing tree at ground level in one shearing stroke. After the tree falls, the harvester straddles the trunk, grips the trunk with the feedworks, and positions its delimbers about the trunk. Thereafter, the feedworks draws the felled tree through the delimber in one substantially continuous cycle of travel. The shear knife is further arranged to be rotated to a vertical and downward cutting position to cut off the top or small end of the delimbed tree.

Adrian L. Landers &
C.B. Byrd
INVENTORS

BY Arnold, Roylance,
Kruger & Durkee
ATTORNEYS

Adrian L. Landers &
C. B. Byrd
INVENTORS

BY Arnold, Roylance,
Kruger & Durkee
ATTORNEYS

Adrian L. Landers &
C.B. Byrd
INVENTORS

BY Arnold, Roylance,
Kruger & Durkee
ATTORNEYS

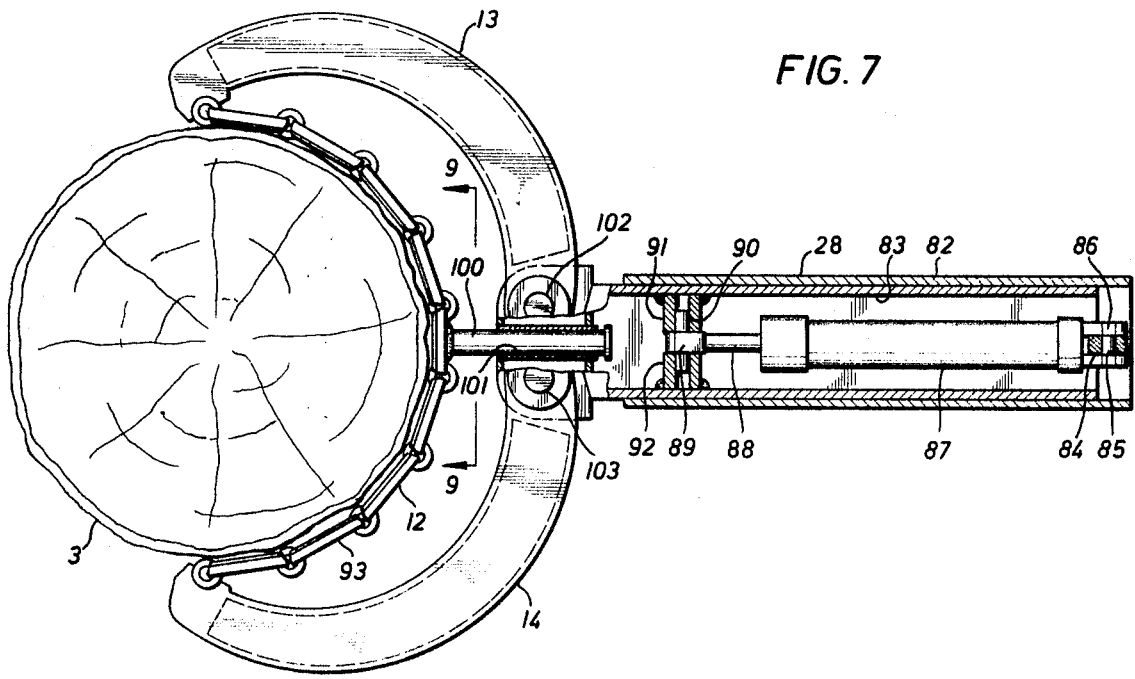

PATENTED JUL 27 1971  3,595,288

Adrian L. Landers &
C. B. Byrd
INVENTORS

BY Arnold, Roylance,
Kruger & Durkee

ATTORNEYS

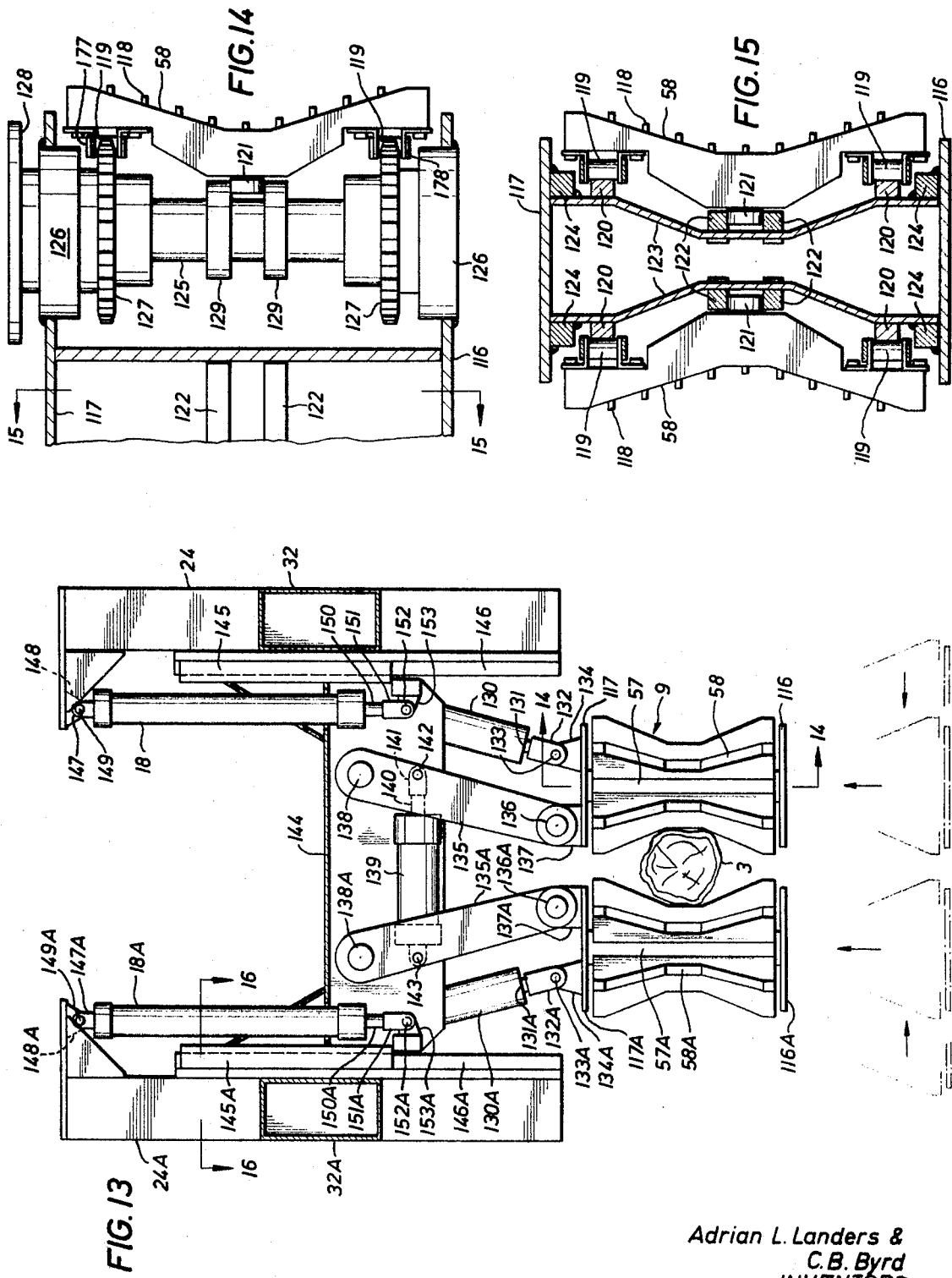

Adrian L. Landers &
C. B. Byrd
INVENTORS

BY Arnold, Roylance,
Kruger & Durkee
ATTORNEYS

3,595,288

TREE HARVESTING METHOD AND APPARATUS

Background of Invention

This invention relates to tree harvesting methods and apparatus, and more particularly relates to improved methods and apparatus for felling, delimbing, and detopping selected standing trees in a forest.

It is well known that trees are felled for the purpose of providing both lumber and wood pulp. Depending upon how large and straight is the tree, the tree is felled and thereafter delimbed and detopped to provide either a saw log or a chip log, or the like.

Conventional logging techniques are still largely manual in character, although power saws and the like are now widely used. Accordingly, many types of mechanical tree harvesters have been proposed from time-to-time, whereby the manual aspects of felling and delimbing trees can be substantially eliminated or reduced. However, such harvesting equipment as has been found useful has generally been utilized for special applications only, and no such device or equipment has hitherto been found satisfactory for general usage.

For example, it will be obvious that any tree harvester capable of handling standing trees having a trunk diameter of 12—30 inches or larger must, of necessity, be quite massive in construction. However, the type of massive equipment hitherto proposed for tree harvestation has been extremely difficult for this reason to move about in the type of irregular terrain where timber stands are normally located. Moreover such equipment is extremely difficult to maneuver about without damage to smaller growth, and thus such equipment has usually been employed only for "clear cutting" wherein an area is almost completely denuded of standing timber.

Another factor of even greater importance is that only the lower two-thirds of the length of a tree (generally) is useful for saw log purposes. On the other hand, the entire length of a chip log is usable for wood pulp. For this reason, those mechanical tree harvesters which have been successful for felling and delimbing saw log trees in special instances have wasted the upper third of all trees which were cut for purposes of wood pulp.

These disadvantages of the prior art have been overcome with the present invention, and novel tree harvesting methods and apparatus are disclosed wherein trees may be selectively felled without abnormal risk to smaller adjacent growth, and wherein any portion of the fallen tree may be delimbed and detopped as desired, all normally within approximately a one minute time interval.

Summary of Invention

A preferred embodiment of apparatus constructed and operated according to the concept of the present invention, comprises a four-wheeled, diesel-powered vehicle, having four large-diameter pneumatic tires capable of absorbing the shocks received from traversing irregular terrain, and further having a separate hydraulic motor for selectively driving each wheel independently of each of the other three wheels and at variable speeds both forward and reverse.

A pair of parallel arms, which are spaced far enough apart to be disposed about the base of the largest tree expected to be cut, are horizontally mounted on the front of the harvester. A swinging closure member is pivotally attached to the free traveling end of one arm whereby it may close and lock with the free traveling end of the other arm. A smaller shear knife is mounted on the closure member with its cutting edge directed toward the harvester when the closure member is engaged, and a large hydraulically actuated shear knife is slidably mounted between the two parallel arms with its cutting edge directed forwardly of the harvester toward the smaller knife. Alternatively, an anvillike metal block may be provided for this purpose instead of a knife.

A delimber assembly portion includes a pair of confronting chains of knives, each chain being connected between the outer ends of a pair of pivotally connected arms, and each pair of arms if further mounted in a hinged manner on a movable support assembly. A gripping feedworks, which is located centrally beneath the chassis of the harvester, and is composed of a pair of selectively positionable flights or endless chains of moving links adapted to engage the fallen tree. Each such flight is rotatable oppositely of the other flight.

In operation, the harvester is driven up to the tree selected to be felled, the closure member is opened, and the harvester is driven further toward the tree until the two parallel arms are thrust forward about the base of the tree. The closure member is then closed and locked to position the small knife horizontally toward the tree at its base and toward the harvester. The large shear knife is driven horizontally toward the tree at its base and toward the small knife on the other side.

It is the function of the large knife to shear off the tree at its base, and the small knife merely cuts a positioning notch on the other side. Thus, the tree will fall toward the small knife and away from the harvester when the large knife passes completely through the tree trunk.

After the tree is felled, the harvester may be withdrawn a short distance to the rear to draw the closure member and the far ends of the two parallel shearing arms from under the tree trunk if necessary. The shearing assembly is then raised to an elevated position, and the harvester may then be driven forward to straddle the large end of the fallen tree. The two traveling belts or flights of the feedworks may then be lowered and then closed together to grip the stub end of the tree trunk. Thereafter, the arms supporting the two chains of delimbing knives may be lowered about the tree trunk and brought together in a gripping manner whereby the two chains of delimbing knives will each partially encircle the tree trunk. The cutting edges of the delimbing knives will be directed up the tree trunk toward the branches. Further, one of the two chains of delimbing knives should be located forwardly of the other chain, since the two chains will progressively encircle a greater proportion of the circumference of the trunk as the knives progress from the larger end of the trunk toward the smaller end, whereby the two knife chains will not engage and interfere with each other.

The feedworks may then be activated, and the two flights will rotate to pull the tree between the right and left pairs of wheels of the stationary harvester and toward its rear. In those cases where larger trees with abnormally large limbs are sought to be harvested, the harvester may be "walked" forward along the felled tree by means of the wheel drives as well as the feedworks. In either case, the delimber knives encircling the tree will function to conveniently slice or shear off the branches progressively "up" any portion or all of the length of the fallen tree as desired. Alternatively, if the tree has fallen between two closely spaced other trees which are to be preserved, and if it is inconvenient to delimb the tree in the particular location where it has been felled, the flights may be stopped and the feedworks held in gripping engagement with the tree trunk, whereby the harvester can then carry or drag the tree to a more convenient location for delimbing.

After the tree has been delimbed to the extent desired, the delimbing knife chains may be removed from the tree trunk and returned to their normal elevated location. The shearing arms may then be rotated in its elevated location to a vertical position immediately above the end of the delimbed portion of the fallen tree, the closure member swung under the tree and into engagement with the opposite shearing assembly arm, and the large shear knife thereafter driven downward to cut off the limbed top of the tree. The log may then be carried away be conventional techniques.

It will be apparent that since both the delimber and shearing assemblies may be raised to a retracted overhead position when not in use, the harvester may be easily maneuvered about even in a relatively dense forest without causing unreasonable damage to adjacent trees which are of value and which are sought to be preserved. Moreover, the preferred embodiment of the present invention has a relatively short wheelbase, as compared to the harvesters of the prior art, and this greatly facilitates maneuverability. The two parallel shearing booms extending forwardly of the harvester need be spaced apart only enough to be able to clear the tree intended to be cut, and they need only be long enough so that there is adequate clearance between the two shearing knives, when the closure member is closed and locked about the backside of the standing tree, and when the large shearing knife is in a retracted position.

A further feature of the apparatus of the present invention is the large amount of underneath clearance provided below the harvester, and between its wheels, by virtue of the straddling configuration of the equipment. This permits the harvester to harmlessly roll over smaller trees which would otherwise be crushed by the harvesters of the prior art.

Another feature of the foregoing apparatus, is that the feedworks is preferably centrally located below the harvester chassis, and the fact that each flight may be movable independently of the other. This permits the harvester to straddle and grip the fallen tree more firmly and at any location along the length of the tree desired, whereby the tree may be dropped at any time and at any location chosen by the operator.

The harvester is designed to be operated by one man, although a second man may act as a "spotter" to assist in guiding the operator in maneuvering the harvester to the most advantageous location. Thus, a tree may be felled, delimbed and detopped within an average time interval of one minute with a crew not exceeding two men. Even the largest and most diligent and skilled crew of workmen cannot fell, delimb and detop a large tree within such a short interval, even when working furiously with all of the conventional powersaws and other like equipment which is usually available.

These and other features and advantages of the present invention will be apparent from the following detailed description, wherein reference is made to the figures of the accompanying drawings.

DRAWINGS

FIG. 7 is a detailed representation, partly in cross section, of the cutting portion of one half of the delimbing assembly when such cutting portion is closed about a portion of the tree trunk of relatively large circumference.

FIG. 8 is a similar representation of the apparatus depicted in FIG. 7, when such cutting portion is closed about a portion of the tree trunk of smaller circumference.

FIG. 9 is a detailed pictorial representation of a portion of a chain of cutting knives suitable for use with the delimbing assembly depicted in FIGS. 7 and 8.

FIG. 10 is another different pictorial view of a portion of the cutting knives depicted in FIG. 9.

FIG. 13 is a pictorial representation of the basic operating components of the feedworks assembly portion of the harvester depicted in FIGS. 1 and 2.

FIG. 14 is a pictorial representation, partly in cross section, of the details of a portion of the apparatus depicted in FIG. 13.

FIG. 15 is a pictorial representation, partly in cross section, of the details of a different portion of the apparatus depicted in FIG. 13.

DETAILED DESCRIPTION

Figure 1:
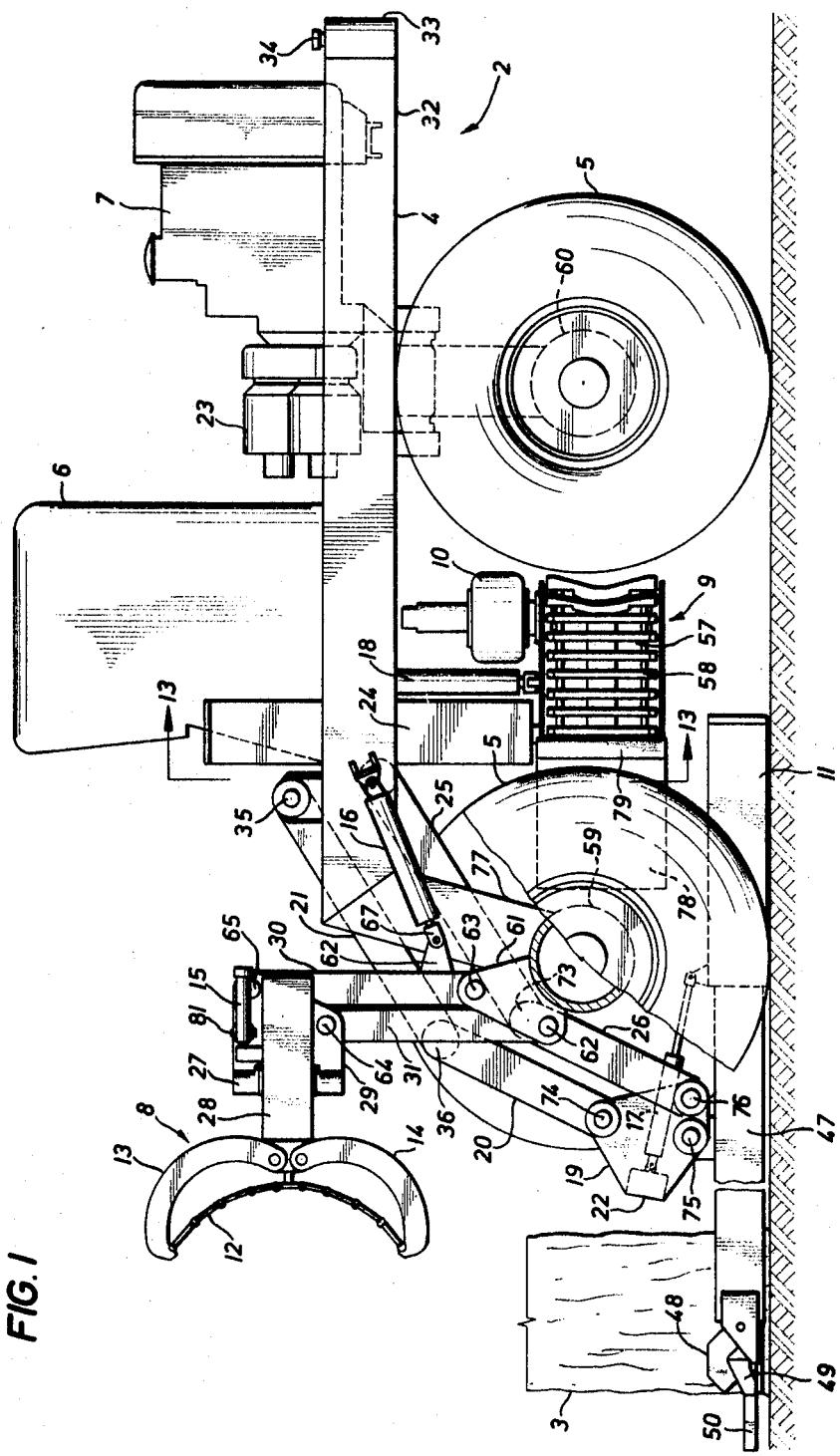
FIG. 1 is a pictorial and partially cutaway side view of the general configuration of an exemplary form of tree harvester embodying the concept of the present invention, and includes a representation of the basic details of a suitable feedworks, a suitable shearing assembly, and a suitable delimbing assembly.

Referring now to FIG. 1, there may be seen a side view of an exemplary form of apparatus suitable for purposes of the present invention, and in particular, showing a suitable tree harvester 2 arranged in confronting relationship to a standing tree 3 sought to be felled, delimbed and detopped. More particularly, the tree harvester 2 may be seen to include a suitable chassis 4 which supports a cab 6 and diesel engine 7. The chassis 4 is preferably supported by four suitably spaced apart wheels 5, each independently mounted thereon as will hereinafter be apparent. A suitable delimber 8 and feedworks composed of a pair of flights 9 and 9A are also provided (only one flight 9 being depicted). As will also be explained, each flight 9 and 9A is separately powered, and thus a suitable hydraulic motor and gear reduction assembly 10 is provided to power flight 9. The harvester 2 may also be seen to include a suitable shearing assembly 11 which projects out and about the tree 3.

Referring again to FIG. 1, and to the delimber assembly 8, it may be seen to include an adjustable pair of curved gripping arms 13 and 14 which are pivotally joined to partially encircle the tree 3 for delimbing purposes after the tree 3 has been felled. The delimber assembly 8 will hereinafter be seen to include two such assemblies, but only one of which is depicted in FIG. 1 for simplicity purposes. The outer ends of the delimber gripping arms 13 and 14 may be seen to support a plurality of delimbing knives 12 interconnected in the manner of a chain. Accordingly, the two gripping arms 13 and 14 may be rotated hingedly through a 90° arc by means of an actuating cylinder 15, the point of rotation being the hinge pin 27, whereby the chain of delimbing knives 12 may be wrapped about one-half or more of the circumference of the tree 3.

As may be seen, a suitable hydraulic actuating cylinder 16 is provided for lowering and raising the delimber assembly 8 as desired. Another hydraulic actuating cylinder 17 is provided for the purpose of rotating the shearing assembly 11 about pivot pin 75. Another suitable hydraulic actuating cylinder 18 may be included for the purpose of inwardly and outwardly tilting the flight 9 of the feedworks assembly portion of the tree harvester 2.

The shearing assembly 11 may be supported on the chassis 4 of the tree harvester 2 by means of upper linking arms 21 and 25, which are connected to lower linking arms 20 and 26 respectively. The lower end of linking arm 20 is connected to a suitable shearing link 19 by means of a pivot pin 74, and the lower end of the other linking arm 26 is connected to the shearing link 19 by means of pivot pin 76.

Figure 2:
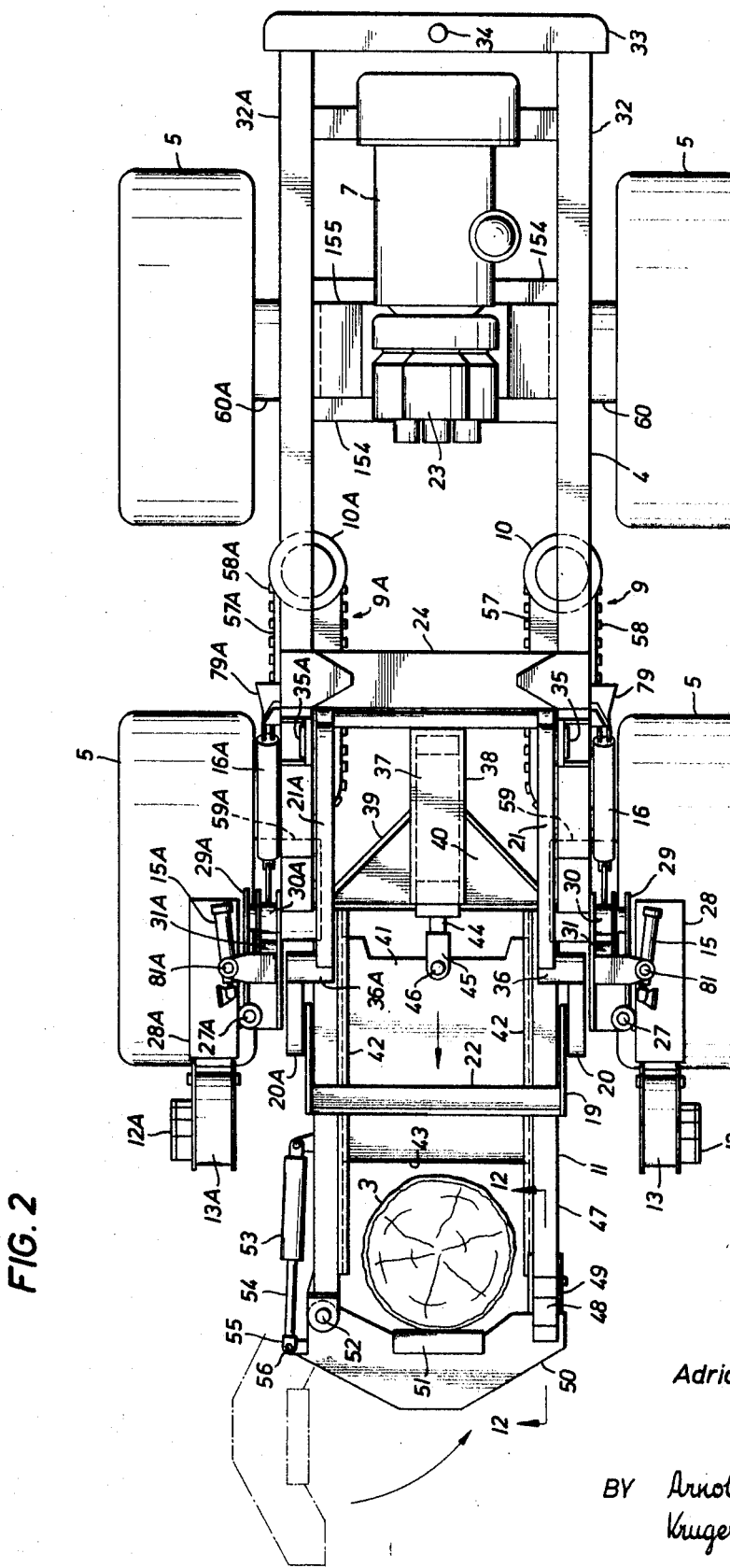
FIG. 2 is a pictorial and partially cutaway top view of the apparatus depicted in FIG. 1, and including views of certain portions not visible in FIG. 1.

It may be seen in FIG. 2 that the complete shearing assembly 11 includes another set of components corresponding to the upper and lower linking arms 20, 21, 25 and 26, respectively, and that these other components are located on the opposite side of the tree harvester 2, although they are not specifically depicted in FIG. 1. Accordingly, a spacing bar 22 may be provided which extends perpendicularly from the forward portion of the shearing link 19 to another shearing link 19A (not depicted in FIG. 1) for the purpose of stabilizing the entire shearing assembly 11.

The harvester 2 may include a diesel engine 7 suitably arranged to actuate one or more hydraulic pumps 23 for the purpose of supplying adequate hydraulic power throughout the entire harvester 2. The chassis 4 may be composed of a pair of spaced-apart longerons 32 and 32A (only one depicted in FIG. 1) and connected at the rear of the harvester 2 by a bumper or crossmember 33 housing a fuel tank suggested by the fuel tank cap 34 depicted. Each longeron 32 and 32A may be seen to be provided with a downward and forwardly directed wheel strut 77 fixedly connected to the motor housing 59 of one of the two forward wheels 5. Each of the two front wheels 5 is separately mounted and driven by an individual wheel drive motor 157 (see FIGS. 17 and 18), whereby each wheel 5 may, if desired for special maneuverings be rotated and actuated independently of the rotation of any of other wheels 5.

A bracket 61 having a generally triangular configuration may be seen to be fixedly connected to the motor housing 59 on the depicted forward wheel 5 and may be provided with pivot pins 62 and 63 for maintaining support arms 31 and 30 of the delimber assembly 8. The upper ends of support arms 30 and 31 may be pivotally connected to a suitable hinge assembly 29 and to a housing 28 containing the means for actuating the gripping arms 13 and 14. More particularly, support arm 31 is pivotally connected to the hinge assembly 29 by means of pivot pin 64, and support arm 30 is pivotally connected thereto by means of pivot pin 65.

It may be noted in FIG. 2 that linking arm 20 is not directly connected to linking arms 21, since the adjacent ends of these two components are preferably spaced laterally one from the other by means of a stiff link 36. Similarly, the upper end of linking arm 26 is fixedly attached in a laterally spaced-apart manner to the lower end of linking arm 25 by means of another stiff link 73. Alternatively, linking arms 20 and 21 and linking arms 25 and 26, respectively, need not be spaced apart and may be a single straight arm member. The upper end of linking arm 21 may be pivotally connected to the chassis 4 by means of a suitable pivot pin 35 mounted on a bracket portion of the adjacent longeron 32, and the other upper linking arm 25 may be similarly pivotally connected to a lower portion of the same longeron 32 by means of another pivot pin or other suitable supporting member hidden in FIG. 1.

Each of the two flights 9 and 9A in the feedworks will be described in greater detail with respect to other figures of the accompanying drawings. It will be noted in FIG. 1, however, that the flight 9 is composed of an endless gripping chain 57 which includes a plurality of gripping link members 58 rotatable in a traveling manner by means of the aforementioned motor and reduction assembly 10. More particularly, the forward portion of the chain 57 may be seen to be protected by a suitable housing 78 having a rearward flared end portion 79.

The feedworks comprising flights 9 and 9A is preferably mounted on the chassis 4 with its forward end slightly lower than its rear end. This forward and downward tilt functions to carry the fallen tree 3 upward as well as toward the rear of the chassis 4, thereby preventing the feedworks from dropping the tree 3 as it is carried to the rear by the flights 9 and 9A, in those instances where the flights 9 and 9A have not securely gripped the tree 3.

The shearing assembly 11 portion of the harvester 2 may be seen to include a frame 47 composed of a pair of forwardly directed and spaced-apart members as will hereinafter be described in greater detail. These members are arranged to be forwardly thrust to a position adjacent opposite sides of the tree 3, and a locking arm 50 which is hingedly mounted on the end of one member may be swung about the opposite side of the tree 3 and then latched to the assembly frame 47 by means of a suitable latching arm 48 engaging a latch member 49, as will be described in greater detail. FIG. 2 shows a top view of the apparatus depicted in FIG. 1, and further illustrates how the chassis 4 may be composed of two spaced-apart longerons 32 and 32A joined at the rear end by the bumper arm 33 as hereinabove stated. A pair of spaced-apart rear frame crossmembers 154 may be provided between the two longerons 32 and 32A immediately below the hydraulic pumps 23. In addition, the two rear wheels 5 are independently mounted on the lower ends of a pivot strut 155, located between and below the two rear frame members 154, as will be later explained in detail.

The shear knife assembly frame 47 may be seen to be composed of a pair of parallel members spaced-apart whereby their forward ends can be thrust about on opposite sides of the base of a tree 3 sought to be felled. As previously stated, the locking arm 50 may be pivotally connected to one of these members by means of a suitable hinge pin 52, whereby the arm 50 may be opened and closed in hingelike manner by an actuating cylinder 53.

More particularly, the actuating cylinder 53 may be seen to be pivotally connected to the shear knife frame 47, and to include piston rod 54 which is pivotally connected to the anchored end of the locking arm 50 by a clevis 55 and clevis pin 56. The free swinging end of the locking arm 50 is provided with a suitable latching arm 48 adapted for latching engagement with a suitable latch member 49 as hereinbefore stated.

The locking arm 50 may also be seen to support a horizontally arranged shearing or notching knife 51 having its cutting edge directed towards the tree 3. As previously stated, it is the function of the notching knife 51 to merely cut a small positioning notch in the backside of the tree trunk, whereby the tree 3 will fall away from the tree harvester 2 rather than on top of it. Instead, the tree 3, is felled by means of a large horizontally movable shearing knife 41 having its cutting edge 43 directed towards the adjacent surface of the tree 3, and which is further adapted for slidable movement between a suitable pair of tracks 42 located on opposite inside surfaces of the shear knife assembly frame 47. The shear knife 41 may be driven by a suitable shear knife actuating cylinder 37 mounted in a protective housing 38. A suitable piston rod 44, which is slidably mounted in the cylinder 37, may be attached to the butt of the shear knife 41 by means of a clevis 45 and clevis pin 46 or other suitable means. The shear knife cylinder housing 38 may further be supported in or attached to the shear knife assembly frame 47 by suitable web brackets 39 or 40 or the like.

As previously stated, the feedworks is composed of a pair of spaced-apart but matching flights 9 and 9A which respectively include endless chains 57 and 57A having spaced-apart apart gripping link members 58 and 58A, respectively. The chains 57 and 57A may be separately and independently driven by actuating motor and gear reduction assemblies 10 and 10A, respectively, in opposite directions to each other, whereby the adjacent confronting portions of the gripping chains 57 and 57A both travel towards the rear wheels 5, and whereby their outer surfaces travel towards the forward wheels 5. When a fallen tree 3 is gripped between the two chains 57 and 57A, it will tend to be urged or pulled towards the rear of the tree harvester 2.

As previously stated with reference to FIG. 1, the delimber assembly 8 is composed of a pair of gripping and delimbing subassemblies, only one of which is specifically illustrated in FIG. 1, and reference may be had to FIG. 2 for an illustration of the components of both assemblies. More particularly, a pair of knife chains 12 and 12A may be supported between gripping arms 13 and 13A, and 14 and 14A, respectively, for engagement with the circumference of the trunk of a tree 3. Both sets of gripping arms 12 and 12A, and 13 and 13A, are rotatable about pivot pins 27 and 27A, respectively, through 90° angles to and from each other. As may be seen in FIG. 2, actuating cylinder 15 is pivotally supported by pivot pin 81, and its associated piston rod is pivotally connected at its free traveling end to housing 28. Similarily, cylinder 15A is pivotally supported by pivot pin 81A, and its corresponding piston rod is pivotally linked at its free traveling end to housing 28A. In addition, gripping arms 13 and 14 are arranged to be raised and lowered by means of actuating cylinder 16, but are rotated horizontally as a unit about hinge pin 27 by means of cylinder 15. Similarly, gripping arms 13A and 14A are rotated horizontally as a unit by actuating cylinder 15A, and are raised and lowered by means of actuating cylinder 16A.

Figure 3:
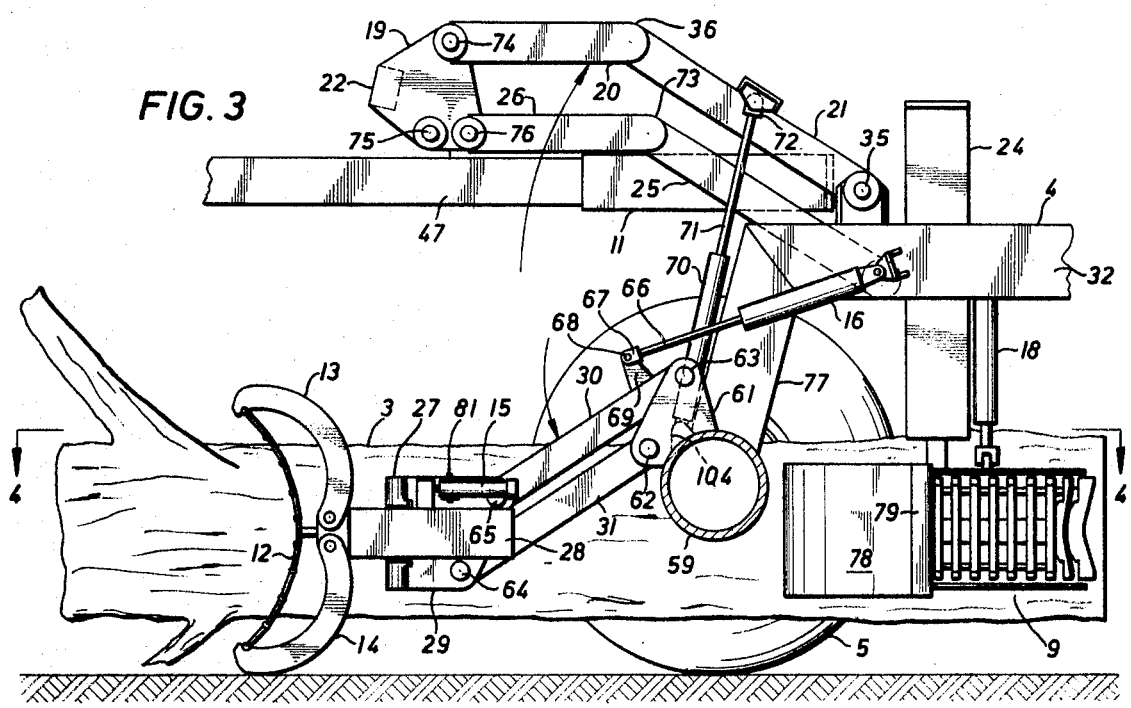
FIG. 3 is a pictorial side-view representation, partially cutaway, of the delimber assembly depicted in FIGS. 1 and 2 when positioned preparatory to delimbing a fallen tree, and further showing the shearing assembly in a relative raised position.
Figure 4:
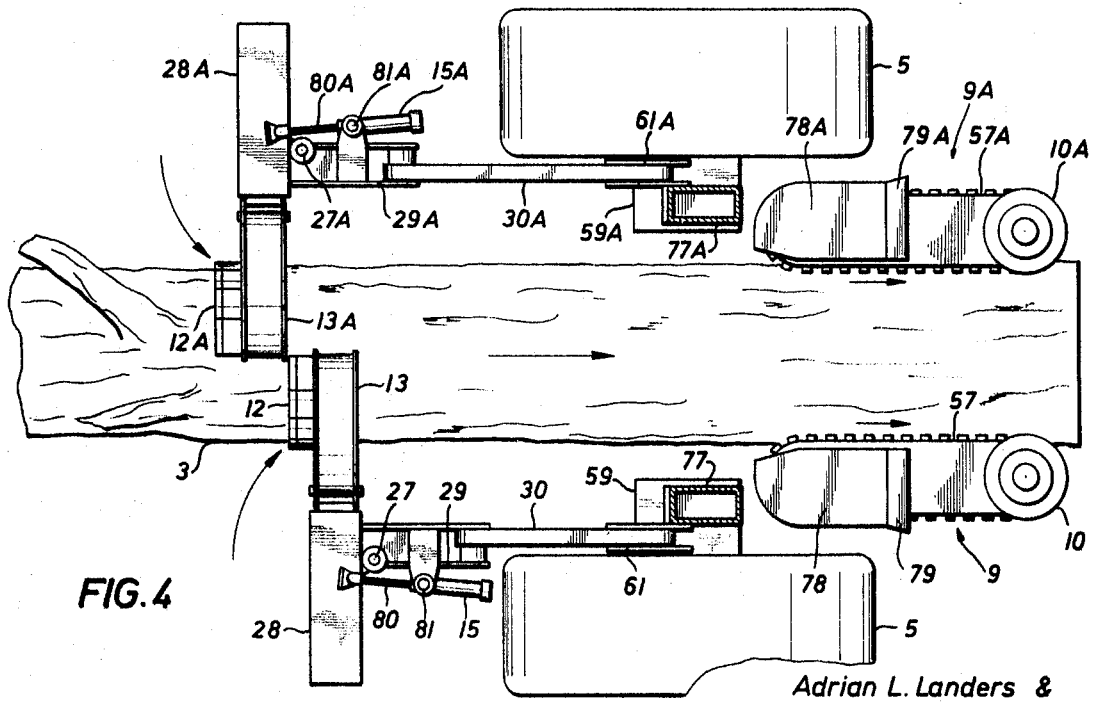
FIG. 4 is a pictorial top-view representation of the delimber assembly depicted in FIG. 3, and further showing the delimber assembly when closed for delimbing purposes about a fallen tree.

Referring now to FIGS. 3 and 4, there may be seen a more detailed representation of the delimber assembly 8, including an illustration of how it may be moved into delimbing engagement with the trunk of the tree 3 after the tree 3 has been sheared and felled. As previously stated, the delimber assembly 8 is normally carried in an elevated position during the shearing operation, and is lowered for engagement with the tree 3 by means of the actuating cylinder 16. In this lowered position, the piston rod 66 may be seen to be fully extended, whereby its free traveling end and the clevis 67 attached thereto urge arms 30 and 31 into a lower extended position. In FIG. 4, it may be seen how gripping arms 13 and 14 have been rotated 90° horizontal toward the tree 3, by means of actuating cylinder 15, whereby the chain of delimbing knives 12 are wrapped or urged about one-half or more of the circumference of the tree 3. In addition, arms 13A and 14A have similarly been pivotally rotated about hinge pin 27A by means of actuating cylinder 15A, whereby the chain of knives 12A may be wrapped at least halfway about the opposite side of the tree 3. Accordingly, the knives 12 and 12A preferably completely surround the circumference of the tree 3 so that all limbs will be stripped from the tree 3, when the tree 3 is drawn or pulled between wheels 5 toward the rear of the harvester 2 by the flights 9 and 9A in the feedworks.

Referring again to FIG. 4, it may be noted that arms 30A and 31A are longer than arms 30 and 31 whereby the chain of delimbing knives 12A are positioned forwardly of the knives 12. Accordingly, as the larger end of the tree 3 is drawn to the rear of the tree harvester 2 and between its wheels 5, both sets of knives 12 and 12A will tend to be wrapped about a greater proportion of the circumference of the tree 3. Thus, it is necessary that the chain of knives 12 be positioned either ahead of or behind the knives 12A, whereby the knives 12 and 12A will not engage or interfere with each other.

Figure 5:
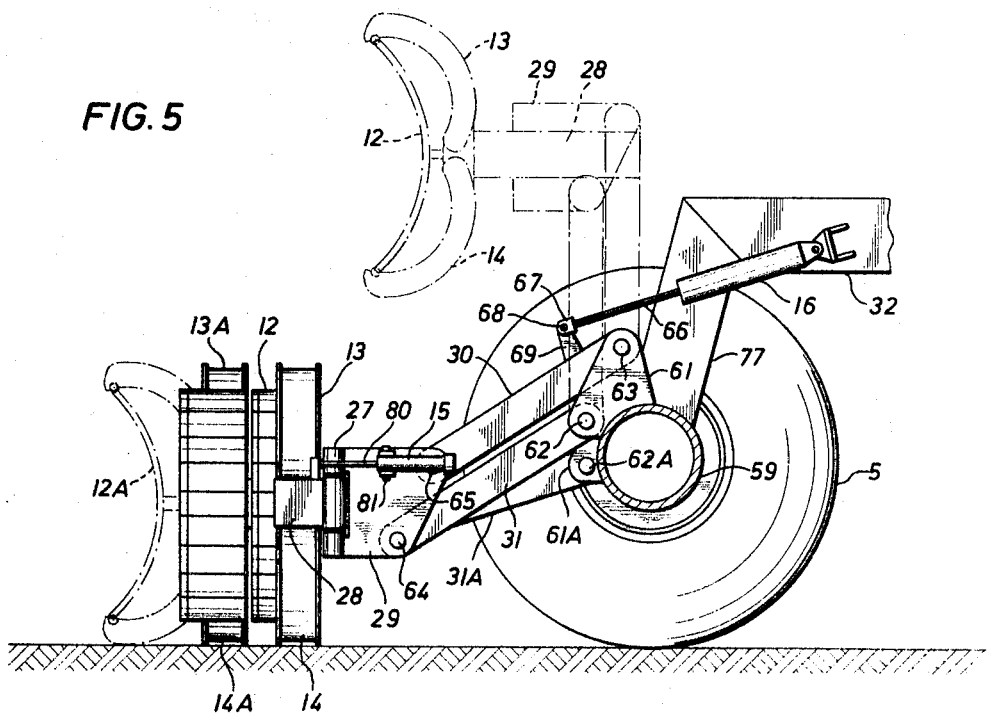
FIG. 5 is another more detailed view of the various components of one half of the delimber assembly depicted in FIGS. 3 and 4.
Figure 6:
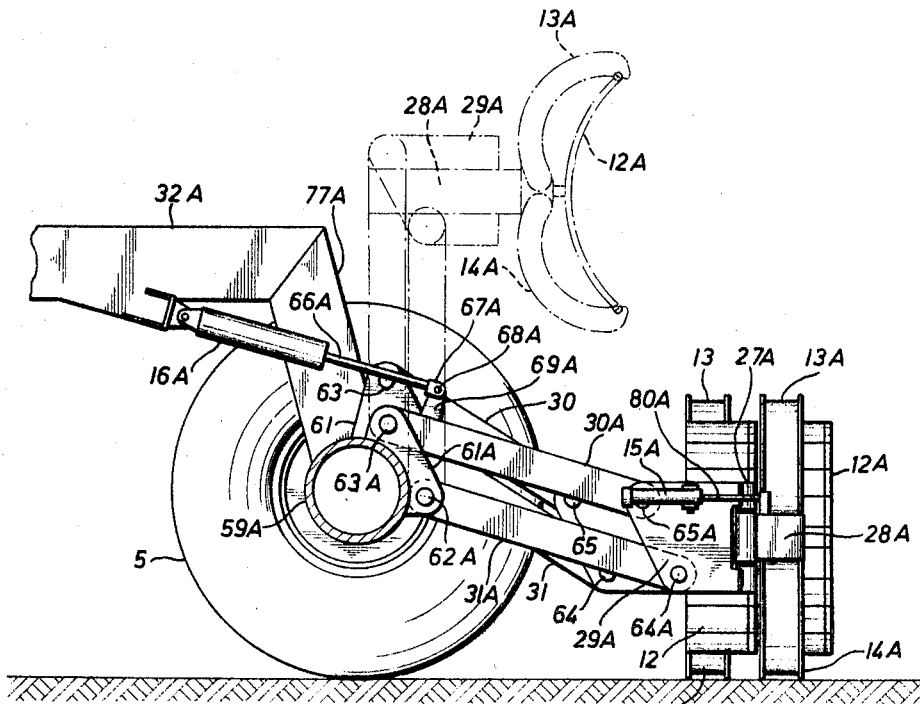
FIG. 6 is a further more detailed view of the various components of the other half of the delimber assembly depicted in FIGS. 3 and 4.

Referring now to FIGS. 5 and 6, it may be seen that the staggered position of the delimber gripping arms 13 and 14, relative to the other gripping arms 13A and 14A, is further provided by bracket 61 being positioned on housing 59 in a different manner than bracket 61A is positioned on motor housing 59A. More particularly, bracket 61 may be seen to be shaped differently from bracket 61A, whereby pivot pins 62 and 63, which pivotally connect arms 31 and 30 to bracket 61, respectively, is located relatively high above the centerpoint of housing 59. On the other hand, bracket 61A is shaped and fixed to housing 59A whereby pivot pins 62A and 63A are located relatively lower and closer to the centerpoint of housing 59A. Accordingly, when the delimber assembly 8 is raised to a fully retracted and elevated posture, gripping arms 13 and 14 will be positioned substantially opposite and in lateral alignment with gripping arms 13A and 14A, whereby the difference in length between support arms 30 and 31 and 30A and 31A, respectively, is compensated. Likewise, actuating cylinder 16 may be seen to be located above the horizontal plane in which actuating cylinder 16A is located, whereby both cylinders 16 and 16A are provided with the same angle-of-attack, and whereby the cylinders 16 and 16A both support the same equivalent load and have the same stroke.

Referring now to FIG. 9, there may be seen a more detailed representation of an assembly of cutting members suitable as knife assembly chains 12 and 12A. More particularly, a plurality of individual knives 93 may be linked together in a chainlike manner by means of a loop or hinge portion 94 on one side and a pair of hinge loops 96 on the other side. Hinge portion 94 may further be seen to be adapted to fit between hinge loops 96 on the next adjacent knife and further to include a hinge pin 95 which rotatably shifts within the hinge loops on the next adjacent knife 93. As further indicated, the cutting edges 97 of each knife 93 is aligned with the cutting edges 97 of the other knives 93 in the chain.

It may be noted that the knife 98 in the center of the chain assembly is further provided with a hinge portion 99 on both sides, and is also narrower in width than any other knife in the chain other than the two knives 93 on each side thereof. In addition, the center knife 98 is centrally mounted on the free traveling end of a guide arm 100 as will hereafter be explained. Referring to FIG. 10, there may be seen another different view of the center knife 98, illustrating how its hinge pins 95 interconnect with the adjacent knives 93 in the chain. In addition, there may be seen how center knife 98 is mounted in a perpendicular manner on the end of the guide arm 100.

Referring now to are 7 and 8, there may be seen an illustration of the difference in arrangement of gripping arms 13 and 14, when they are urged about the circumference of the tree 3 at two different diametrical locations. In particular, when the gripping arms 13 and 14 are clamped about the circumference of the tree 3 at a larger diametrical location, the chain of knives 12 will only partially encircle the trunk of the tree 3. However, as the tree 3 is drawn between the gripping arms 13 and 14, the arms 13 and 14 will be urged closer about the trunk of the tree 3 by the action of the actuating cylinder 87 to adjust for the gradually decreasing diameter of the trunk. As illustrated in FIGS. 7 and 8, an actuating cylinder 87 may be seen to be mounted within an inner sleeve or jacket 83 which, in turn, is slidably enclosed in an outer jacket 82. The cylinder 87 is provided with a clevis 86 and clevis pin 85 fixed to a crossbar 84 which, in turn, is mounted diametrically in the end of outer cylinder 82. A piston rod 88 is slidably disposed within the cylinder 87, and is provided at its free traveling end with a clevis 89 which is rotatably connected to a clevis pin 90. Pin socket members 91 and 92 may be seen to be located at the opposite end of the inner jacket 83, and are positioned to rotatably support the clevis pin 90. Accordingly, when the piston rod 88 is extended from the actuating cylinder 87, this will push the inner jacket 83 out of the outer jacket 82, since the outer jacket 82 is anchored to the hinge assembly 29. This outward movement of the inner jacket 83 operates to urge the outer ends of the curved gripping arms 13 and 14 away from the hinge assembly 29, and to close them about the circumference of the tree 3, due to pivotal movement of arms 13 and 14 about pivot pins 102 and 103. In addition, it will be seen that the guide arm 100, which supports the center knife 98, is longitudinally movable within the guide arm bushing 101 to maintain the center knife 98 urged against the surface of the tree 3 notwithstanding a decrease of circumference of the tree 3. In other words, as the tree decreases in diameter, the piston rod 88 will urge the gripping arms 13 and 14 forward from the outer cylinder 82, thereby pulling the center knife 98 and its adjacent knives 93 into close engagement with the adjacent surface or bark of the tree 3. The guide arm 100 will shift forward through the guide arm bushing 101 to facilitate this action. In this respect, it should be noted that the knives 93 are preferably not all of the same width, and that the knives 93 which are nearer the center knife 98, are preferably narrower in width than the knives 93 which are adjacent the ends of arms 13 and 14. This difference in width of the knives 93 in the chain 12 enables the chain 12 to be maintained in close shearing engagement with the tree 3, as will be apparent from FIG. 8.

It should be further noted that once the ends of gripping arms 13 and 14 have closed together as depicted in FIG. 8, the guide arm 100 will no longer be pulled forward from the bushing 101. Thereafter, the center knife 98 will be urged against the tree 3 directly by the piston rod 88, and thus the guide arm 100 will tend thereafter to be urged gradually back into and through the bushing 101.

Figure 11:
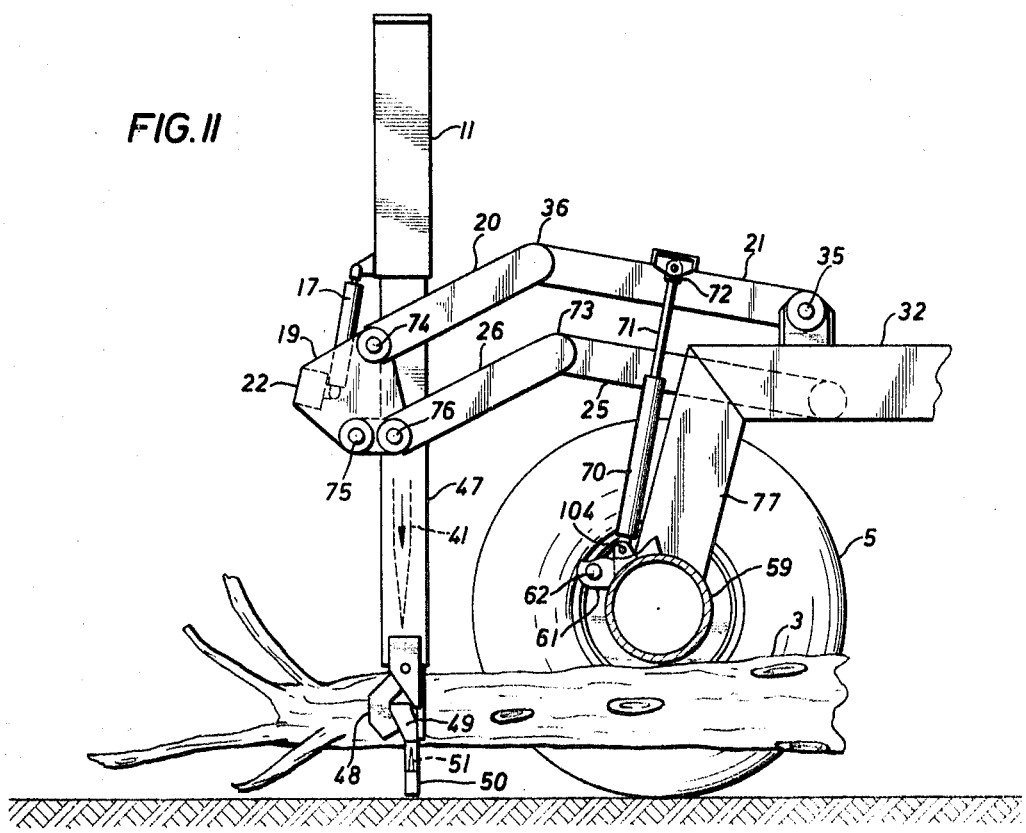
FIG. 11 is a pictorial representation of the basic features of the shearing assembly portion of the harvester depicted in FIGS. 1 and 2, when such shearing assembly portion is positioned for detopping purposes.

After the fallen tree 3 has been pulled through the delimber assembly 8, as hereinbefore explained, it may then be detopped by the shear knife 41. Referring now to FIG. 11, it may be seen how the shearing assembly 11 may be used to detop the remaining portion of the fallen tree 3 which is not ordinarily usable for either lumber or wood pulp. The shearing assembly 11 has been previously elevated by means of the actuating cylinder 70 and extended piston rod 71. In this respect, it will be noted how the cylinder 70 is pivotally connected to the motor housing 59 by means of a bracket and pin 104, and how the free traveling end of the piston rod 71 is pivotally connected to the upper linking arm 21 by a clevis and pin 72 or other suitable rotatable link. The shearing assembly 11 may be rotated in a counterclockwise direction about pivot pin 75, until it is vertically erect, by means of actuating cylinder 17 which is pivotally connected at one end to the spacing bar 22 between shearing links 19 and 19A, and which is connected at its other end to the upper rearward portion of the shear knife assembly frame 47. Accordingly, the frame 47 may be rotated to a vertical position, as previously stated, by contraction of the piston rod into the actuating cylinder 17. Thereafter, the fallen tree 3 may be detopped by means of the shear knife 41 being driven downward by the piston rod 44 in the shear knife actuating cylinder 37 as hereinbefore explained.

Figure 12:
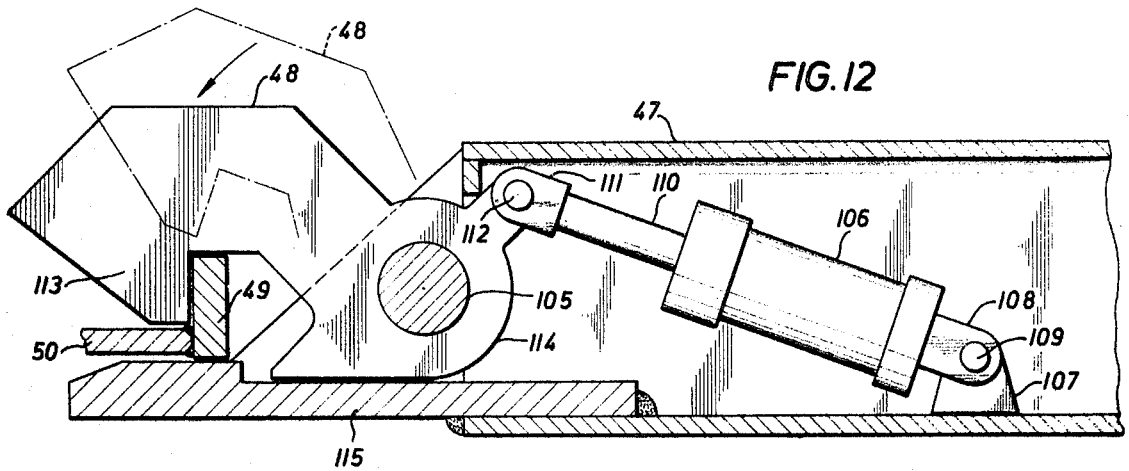
FIG. 12 is a detailed representation, partly in cross section, of a suitable locking assembly for the shearing assembly portion of the harvester depicted in FIGS. 1 and 2.

Referring now to FIG. 12, there may be seen a detailed representation of a suitable latching assembly for interconnecting and locking the locking arm 50 to the shear knife assembly frame 47. In particular, an actuating cylinder 106 may be seen to be pivotally connected at one end, by a clevis 108 and clevis pin 109, to a suitable bracket 107 mounted on the lower inside surface of the frame 47. The piston rod 110, which is located within the cylinder 106, is provided with a clevis 111 and clevis pin 112 at its free traveling end. As may be seen in FIG. 12, the locking arm 50 includes a vertically erected latch member 49. The latching arm 48 may be seen to be provided at one end with a hinge portion 114 rotatably mounted on a suitable pivot pin 105 or the like which is connected to the shear knife assembly frame 47. The other free traveling end of the latching arm 48 may include a hook portion 113 adapted to be rotated arcuately into locking engagement with the latch member 49 when the piston rod 110 is extended from the cylinder 106. Alternatively, when the piston rod 110 is retracted into the cylinder 106, the latching arm 48 is rotated arcuately about the pivot pin 105 in a clockwise manner, thus raising the hook portion 113 up and free of the latch member 49, whereby the locking arm 50 may be moved freely away from the shear knife assembly frame 47 by means of the actuating cylinder 53 as hereinbefore explained. A guide plate 115 may be fixedly attached to the free traveling end of the locking arm 50, as may be seen in FIG. 12, to facilitate locking engagement of the latching arm 48 with the latch member 49.

As also hereinbefore explained, the feedworks assembly is preferably adapted to permit the operator of the tree harvester 2 to vary the positioning of the flights 9 and 9A to permit the fallen tree 3 to be picked up or dropped as desired. Referring now to FIG. 13, there may be seen a representation of the details and components of the flights 9 and 9A whereby this may be accomplished. In particular, the flights 9 and 9A may each be seen to be basically composed of a pair of generally aligned endless belts or chains 57 and 57A, which are independently and separately rotated or travelled in opposite directions to each other by means of motors 10 and 10A, respectively, as hereinbefore explained. As may further be seen, each belt or chain is provided with a plurality of spaced-apart and vertically mounted gripping link members 58 and 58A which each have a generally concavelike and confronting configuration for more securely gripping the rounded surface of the fallen tree 3. The gripping chains 57 and 57A are mounted between upper and lower end plates 117 and 116, and 117A and 116A, respectively. The upper end plates 117 and 117A are pivotally suspended from pivot pins 136 and 136A located in the lower ends of support arms 135 and 135A. The upper ends of support arms 135 and 135A are pivotally suspended, in turn, from pivot pins 138 and 138A mounted on a vertically movable cross frame 144. As may also be seen, actuating cylinders 130 and 130A are also pivotally attached at the upper ends to the cross frame 144, and the free traveling ends of piston rods 131 and 131A are pivotally linked by means of clevises 132 and 132A, and clevis pins 133 and 133A, to brackets 134 and 134A, respectively, which are mounted on the upper sides of upper end plates 117 and 117A.

As will be apparent in FIG. 13, the vertical positioning of the flights 9 and 9A is provided by vertical movement of the cross frame 144, as will hereinafter be explained in detail. The flights 9 and 9A may be tilted to and from each other by pivotal movement about pivot pins 136 and 136A, such pivotal movement being provided by actuating cylinders 130 and 130A.

Horizontal movement of the flights 9 and 9A to and from each other is provided by the horizontally arranged actuating cylinder 139. As may be seen in FIG. 13, the actuating cylinder 139 is pivotally linked at one end to support arm 135A by pivot pin 143. Piston rod 140, which is slidably disposed in the actuating cylinder 139, has its free traveling end pivotally linked to the other support arm 135 by means of eye 141 and pivot pin 142.

Hydraulic motors 10 and 10A have been omitted from FIG. 13 for the purpose of simplifying the drawing. These motors 10 and 10A are located behind the cross frame 144, and are positionable as a unit with the flights 9 and 9A, whereby positioning of the flights 9 and 9A in the manner hereinbefore described will not interfere with travel of the chains 57 and 57A.

Referring again to FIG. 13, cross frame 144 may be seen to be vertically movable between longerons 32 and 32A by means of actuating cylinders 18 and 18A. More particularly, actuating cylinder 18 is pivotally suspended by means of clevis 147 and clevis pin 149 from a bracket 148 which is mounted at the upper end of frame member 24. Similarly, actuating cylinder 18A is pivotally suspended from a bracket 148A, which is mounted at the upper end of frame member 24A, by means of clevis 147A and clevis pin 149A. Piston rod 150, which is slidably disposed in actuating cylinder 18, is connected at its free traveling end to bracket 153 by means of clevis 151 and clevis pin 152. Bracket 153, in turn, is fixedly attached to the adjacent end of cross frame 144. Piston rod 150A, which is slidably disposed within actuating cylinder 18A, is similarly connected to bracket 153A by means of clevis 151A and clevis pin 152A. Bracket 153A may be seen to be fixedly attached to the other end of cross frame 144 opposite from bracket 153.

Figure 16:
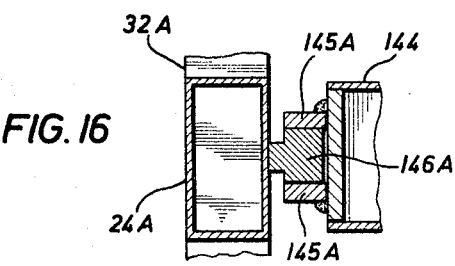
FIG. 16 is a pictorial representation, partly in cross section, of the details of another different portion of the apparatus depicted in FIG. 13.

Referring now to FIG. 16, there may be seen a detailed cross sectional representation of the means by which cross frame 144 is slidably guided in a vertical direction between frame members 24 and 24A, and which is represented only generally in FIG. 13. In particular, FIG. 16 depicts the spaced-apart side portions of a track member 145A vertically mounted along the length of the adjacent end of the cross frame 144. Frame member 24A, in turn, is provided with a suitable guide rib 146A fixedly attached thereto, which guide rib is arranged and adapted to slidably fit between the side portions of the track member 145A. As may be seen in FIG. 13, a similar track member 145 is located on the opposite frame member 24 for slidably supporting a similar guide rib 146 fixed vertically along the opposite end of the cross frame 144.

Referring now to FIGS. 14 and 15, there may be seen a detailed representation of the driving and driven components of the flights 9 and 9A, and how such components are maintained in a stable relationship while pulling a fallen tree 3 to the rear of the tree harvester 2. Referring in particular to FIG. 14, there may be seen a vertically arranged drive shaft 125 rotatably mounted within a pair of bearings 126 in the upper and lower end plates 117 and 116, and fixedly connected to a flange 128 which, in turn, is rotatably driven by motor 10. A pair of sprocket wheels 127 may be fixedly mounted on the drive shaft 125, adjacent its upper and lower ends, and a pair of bearings or flanges 122 may be fixed in a suitably spaced-apart manner to the central section of the drive shaft 125 as depicted in FIG. 14.

The belts or chains 57 and 57A, which have previously been generally referred to with respect to FIGS. 1 and 2, are each preferably a pair of endless sprocket chains composed of rollers 119, as illustrated in FIG. 14. Accordingly, each gripping link member 58 may be seen to be vertically mounted across these sprocket chains and equally spaced from adjacent link members 58. Rotation of the drive shaft 125 will travel the rollers 119 and carry the link members 58 forward and then around to the rear of the flight 9 in which they are located.

As may further be seen in FIG. 14, each gripping link member 58 may also be provided with a plurality of vertically arranged and spaced-apart teeth 118 for more securely engaging the surface of the tree 3. Each link member 58 also preferable includes a roller 121 centrally and rotatably mounted on the rear surface of the link member 58 so as to ride between the bearing surfaces of the flanges 129 and a track 122. Accordingly, the weight of the tree 3 will bear on the flanges 129 and track 122.

Referring now to FIG. 15, there may be seen the arrangement of the various components of the flight 9 at a location forward of the drive shaft 125. More particularly, vertical frame members 123 are supported between the upper and lower end plates 117 and 116, respectively, and are provided on each side with upper and lower pairs of guide ribs 120. In addition, tracks 122 may be seen to be located on the outer oppositely facing surfaces of the frame members 123, for supporting the rollers 121 mounted on each gripping link member 58. The ribs 120 may be seen to guide the sprocket rollers 119 which are driven by the sprocket wheels 127 illustrated in FIG. 14, thereby stabilizing the positions of the gripping link members 58. Braces 124 may be provided for connecting the frame members 123 to the upper and lower end plates 117 and 116, and for strength purposes in general.

Figure 17:
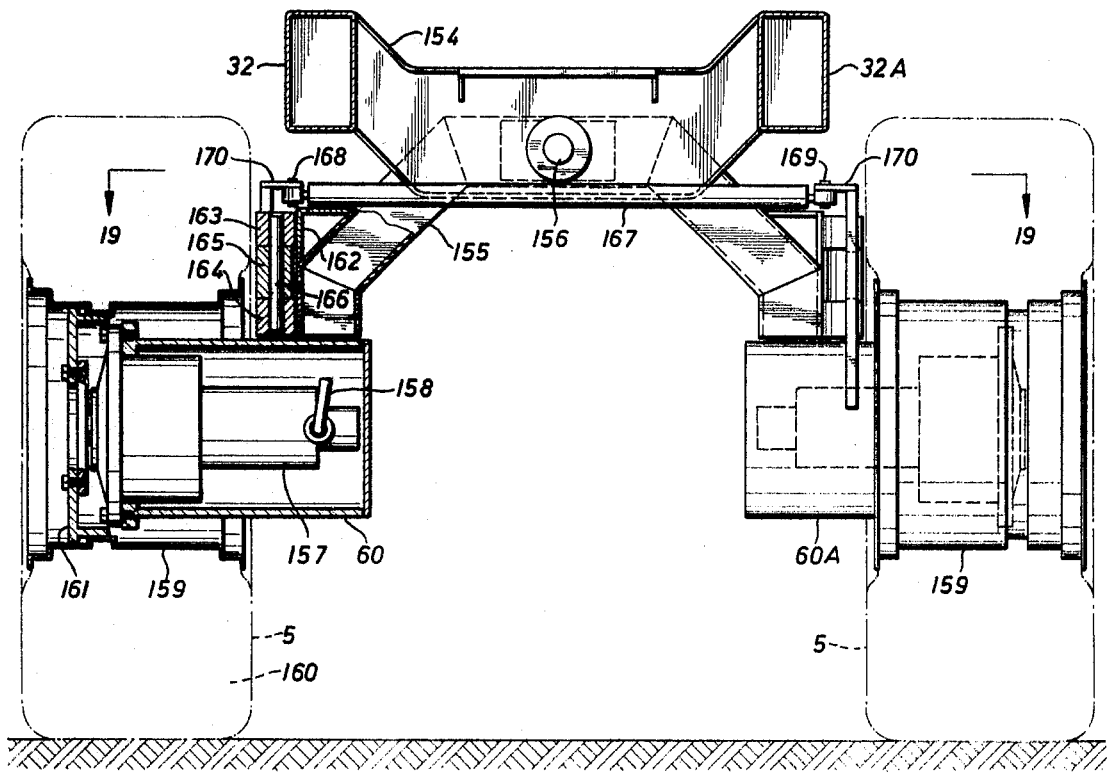
FIG. 17 is a pictorial representation, partly in cross section, of the details of the steering portion of the harvester depicted generally in FIGS. 1 and 2.

It is a feature of the apparatus depicted in FIGS. 1 and 2, that the rear wheels 5 are mounted in a rocking relationship to the chassis 4 for maintaining all four wheels 5 in contact with the surface of the earth when the tree harvester 2 is required to move across irregular terrain. Referring now to FIG. 17, there may be seen a more detailed representation of the manner in which the rear wheels 5 are mounted on the chassis 4. In particular, there may be seen a pivot strut 155 having an inverted U-shaped configuration, and which is pivotally connected at its center point to the centers of the rear frame members 154 by means of a large pivot pin 156.

As may be seen in FIG. 17, the tree harvester 2 is preferably steered by means of the rear wheels 5, rather than by means of the forward pair of wheels as is conventional with equipment of this type. More particularly, each wheel 5 is composed of a large pneumatic tire 160 mounted in a conventional manner on a suitable wheel rim 159. Each wheel rim 159, in turn, is connected in a conventional manner to a suitable wheel hub 161 which, in turn, may be connected to be independently driven at a selectively variable rate and direction of rotation by means of a wheel drive motor 157. Each wheel drive motor 157 is preferably a hydraulic-type motor, and may receive hydraulic pressure by a conventional hydraulic conduit 158 connected to the pumps 23 depicted in FIGS. 1 and 2. The wheel hub 60 of each rear wheel 5 may be fixedly attached to a steering bracket 176 (see FIG. 20) having a suitable hinge portion 165.

Referring again to FIG. 17, there may be seen an angle bracket 162 which is provided with upper and lower hinge links 163 and 164 which, in turn, are pivotally connected by a kingpin 166 to the hinge portion 165, of the steering bracket 176 to form a steering joint for each rear wheel 5. Thus, each rear wheel 5 may be rotated about a vertical axis defined by its respective kingpin 166. Since both rear wheels 5 should be turned in conjunction with each other, they are preferably connected together by a suitable tie rod 167 or the like. In particular, the tie rod 167 may be pivotally connected by a pivot pin 168 at one end to a suitable tie rod bracket 170 mounted on the upper hinge link 163. A suitable pivot pin 169 may connect the other end of the tie rod 167 to the other rear wheel 5 in the same manner.

Figure 18:
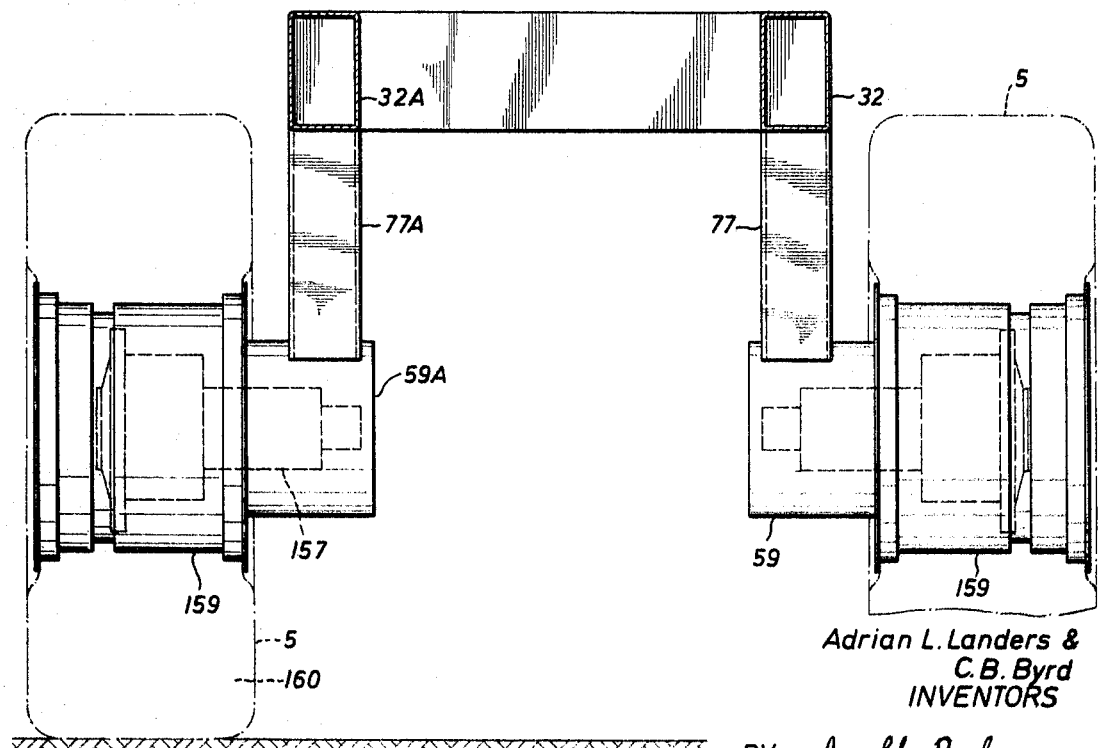
FIG. 18 is a pictorial representation, partly in cross section, of the front wheel portion of the harvester depicted generally in FIGS. 1 and 2.

Referring now to FIG. 18, it may be seen that the forward wheels may be fixedly positioned with respect to the chassis 4. In particular, wheel housing 59A may be fixedly mounted on the lower end of the wheel strut 77A which is fixedly connected at its upper end to longeron 32A as hereinbefore described. The front wheels 5 may each also be composed of a suitable large-diameter pneumatic tire 160 mounted in a conventional manner on a wheel rim 159, as described with respect to FIG. 17, and are preferably independently driven by separate hydraulic motors 157 as hereinbefore stated.

Figure 19:
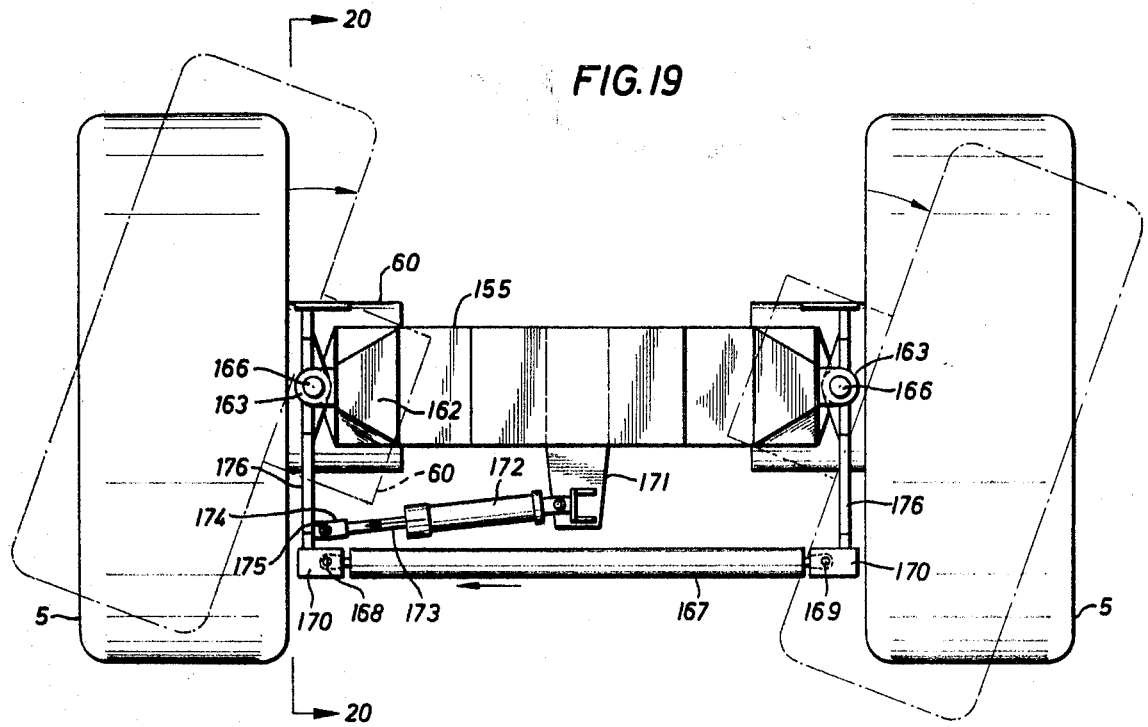
FIG. 19 is a top view of the apparatus depicted in FIG. 17.

Referring now to FIG. 19, there may be seen an overhead view of the rear wheels 5 for depicting how they may be steered. More particularly, the pivot strut 155 may be seen to be provided with an angle bracket 162 at each end. Each angle bracket 162 supports the hinge links 163 and 164, as hereinbefore stated, and the hinge links 163 and 164 are pivotally or hingedly joined to the hinge portion 165 of the steering bracket 176, by means of the king pin 166, as hereinbefore described.

Each rear wheel 5 is turned by pivotal or arcuate movement of its steering bracket 176, and this movement is provided by the steering cylinder 172. More particularly, the steering cylinder 172 may be seen to be pivotally connected at one end to a bracket 177 which is centrally located on the lower portion of the pivot strut 155. The piston rod 173, which is slidably disposed in the steering cylinder 172, is preferably pivotally connected at its free traveling end by means of clevis 174 and clevis pin 175, to a suitable portion of the steering bracket 176, at a location spaced from the king pin 166. As further depicted in FIG. 19, the tie rod 167 is provided with suitable clevis and clevis pin assemblies 168 and 169 at each end, for interconnection with tie rod brackets 170 which are also connected to the rear edge of each steering bracket 176. Hence, the piston rod 173 operates to position the rear wheel 5 adjacent its free traveling end, and the movement of the one wheel 5 operates to move the other rear wheel 5 by means of the tie rod 167.

Figure 20:
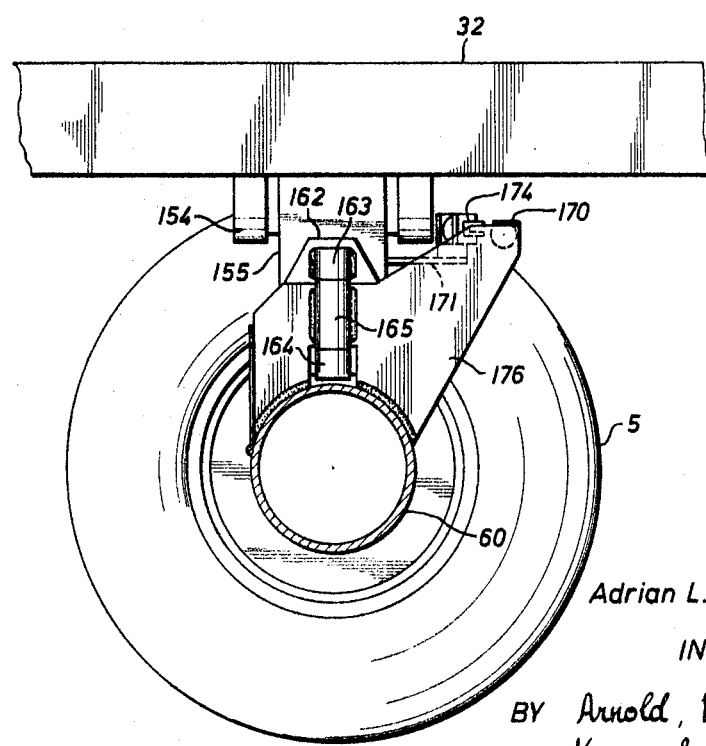
FIG. 20 is a more detailed representation of a selected portion of the apparatus depicted generally in FIGS. 17 and 19.

Referring now to FIG. 20, there may be seen another illustration of a representative one of the two rear wheels 5. In particular, the rear wheel housing 60 may be seen to fixedly support the steering bracket 176 whereby its hinge portion 165 is positioned vertically and immediately above the central axis of the housing 60. In addition, the tie rod bracket 170 may be seen to be fixedly mounted on the rearward upper end of the steering bracket 176 adjacent the clevis 174 which is mounted on the free traveling end of the piston rod 173.

It will be apparent from the foregoing that other modifications and variations may be made in the structures and procedures described herein without substantial departure from the essential concept of the present invention. Accordingly, it should be clearly understood that the forms of the invention described herein and depicted in the accompanying drawings, are exemplary only and are not intended as limitations on the scope of the present invention.

We claim:
1. A tree harvester comprising:
   a self-propelled vehicle adapted to fell a standing tree and to thereafter straddle such tree,
   delimbing means forwardly mounted on said vehicle for circumferentially engaging the trunk of such fallen tree, gripping means centrally suspended beneath said vehicle for straddling and gripping such fallen tree and for pulling such fallen tree through said delimbing means, said gripping means including a first flight assembly arranged generally longitudinally of and below said vehicle, a second flight assembly arranged generally longitudinally of and below said vehicle and in a spaced and side-by-side relationship to said first flight assembly, and vertical control means for raising and lowering said first and second flight assemblies, lateral control means for selectively varying the spacing between said first and second flight assemblies, and tilting means for arcuately moving said first and second flight assemblies about first and second, spaced pivot axes located in a longitudinal direction with respect to said vehicle.

2. The tree harvester described in claim 1, wherein said gripping means further includes a first engaging means interconnected with said first flight assembly for continuous movement in a generally clockwise direction, a second engaging means interconnected with second flight assembly for continuous movement in a generally counterclockwise direction, and a plurality of gripping members arranged in a spaced-apart manner on said first and second engaging means.

3. The tree harvester described in claim 2, wherein said gripping means further includes a first hydraulic driving motor means interconnected to drive said first engaging means, and a second hydraulic driving motor means interconnected to drive said second engaging means.

4. The tree harvester described in claim 3, wherein said vehicle comprises a chassis adapted to suspend said gripping means and having a pair of front wheel struts spaced apart to clear a straddled fallen tree, a pair of front wheels interconnected to said front wheel struts to raise the front wheel struts to raise the front end of said vehicle above said straddled fallen tree, a rear wheel support strut interconnected at the rear end of said chassis, and a pair of rear wheels interconnected with the ends of said rear wheel strut to raise the rear end of said vehicle above said straddled fallen tree.

5. The tree harvester described in claim 4, wherein said vehicle further comprise steering means for rotating said rear wheels pivotally at the ends of said rear wheel strut.

6. The tree harvester described in claim 5, wherein said rear wheel strut has an inverted and generally U-shaped configuration.

7. The tree harvester described in claim 6, wherein said rear wheel strut is pivotally connected to said chassis.

8. A tree harvester for felling and delimbing a tree comprising:

a movable vehicle, a frame pivotally mounted on said vehicle for positioning between a lower tree-cutting position and an upper storage position, said frame including horizontally spaced frame members for reciprocally supporting a tree-engaging shear blade, and an end gate pivotally mounted on one of said frame members and connectable to said other frame member, means for delimbing a felled tree including first and second articulately coupled knife blade assemblies pivotally mounted on said vehicle for positioning between an upper storage position and a lower tree-delimbing position, said assemblies in said lower position having longitudinally offset locations and respectively covering an arc of at least 180° so as to circumferentially engage the trunk of a felled tree, and gripping means disposed on said vehicle for gripping the trunk of a felled tree and pulling a tree trunk through said delimbing means.

9. The apparatus of claim 8 wherein a linkage mechanism couples said frame to said vehicle and includes means for pivotally moving said frame from a horizontal to a vertical position where said shear blade can top a felled, delimbed tree trunk.

10. The apparatus of claim 9 wherein said linkage means includes link members and arm members pivotally coupling the link members to said frame, said frame being pivotally coupled to said link members and power means interconnected between said link members and said frame members.

11. The apparatus of claim 8 and further including means for manipulating said knife assemblies between a plane parallel to the length of said vehicle and a transverse plane.

12. The apparatus of claim 8 wherein said end gate has a notching knife blade arranged offset with respect to said shear blade, whereby said shear blade can cut through a tree trunk above said knife blade.

13. The apparatus of claim 8 wherein said vehicle has a frame support mounted on forward and rearward sets of wheels and said frame and delimbing means are mounted between said forward set of wheels, said rearward set of wheels being pivotally mounted for steering the vehicle.

14. The apparatus of claim 8 and wherein said gripping means further includes a first flight feeding assembly and a second flight-feeding assembly disposed opposite one another on said vehicle, means for raising and lowering said assemblies relative to said vehicle, each of said flight assemblies having complementary arranged channel-shaped surfaces for adapting to different tree diameters, and means for moving said channel surfaces in a longitudinal direction relative to said vehicle.

15. A method for felling and delimbing a tree comprising the steps of:

shearing a standing tree with a horizontal stroke of a shearing blade located near ground level, elevating the shearing blade to a horizontal position above the felled tree, gripping the tree trunk and moving it longitudinally until the first tree branches are encountered, applying delimbing means to each side of the tree trunk to respectively cover one-half of the tree trunk with articulated knife blade assemblies and applying force to the ends of each knife blade assembly tangential to the trunk of the tree, and pulling such tree trunk through said delimbing means while maintaining the tangential force on the knife blade assembly.

16. The method of claim 15 and further including the steps of positioning the shearing blade in a vertical position and cutting off the top of such felled tree.

17. A tree harvester comprising:

a vehicle having four wheels and a frame, said wheels suspending said frame relative to ground level so that said frame is adapted to be disposed above a felled tree and the forward and rearward wheels are respectively adapted to be disposed to either side of a felled tree, thereby defining a working area between the wheels, the frame and a ground level, means contained on said vehicle for self-propelling said vehicle, means coupled to said frame for felling a standing tree, said felling means being manipulatable between a position for felling a tree and a position clearing said working area, delimbing means mounted on said frame for selectively circumferentially engaging the trunk of a felled tree, spaced apart separate gripping means dependently suspended from said frame intermediate of its length, said gripping means defining a lower opening permitting positioning of said gripping means on opposite sides of a felled tree trunk, said gripping means being engageable with a felled tree trunk and movable for supporting such a felled tree trunk above the ground level a sufficient distance for operation of said delimbing means, and means for operating said gripping means to move a felled tree trunk relative to said frame.

18. The apparatus of claim 17, wherein said frame has a support member mounted for vertical reciprocation relative to said frame, means for reciprocating said support member, link means for pivotally coupling said gripping means to said support member for movement of said gripping means toward and away from one another, and means for moving said link means to move said gripping means relative to one another.

19. The apparatus of claim 17 wherein said delimbing means comprises separate delimbing devices each covering at least one-half of a tree trunk, said delimbing devices being movably mounted for movement between a tree-engaging position and an open position.